June 28, 1966  W. E. HAMILTON  3,258,146
POWER LIFT TRUCK ADAPTER
Filed Aug. 31, 1964

INVENTOR.
WILLIAM E. HAMILTON
BY
ATTORNEY

United States Patent Office 3,258,146
Patented June 28, 1966

3,258,146
POWER LIFT TRUCK ADAPTER
William E. Hamilton, 334 York St., Camden, N.J.
Filed Aug. 31, 1964, Ser. No. 393,458
1 Claim. (Cl. 214—620)

The invention described herein may be manufactured and used by or for the Government of the United States of America for governmental purposes without the payment of any royalties thereon or therefor.

This invention relates to fork lift industrial trucks and in particular concerns an attachment therefor which permits such trucks to be used for moving large trailer vehicles.

Large trailer vehicles are used in the transportation of materials and supplies to a destination and are propelled through the medium of a tractor which is arranged to be readily attached to and detached from the trailer. This mode or transportation is commonly known as a tractor-trailer unit and after a delivery of supplies or material is made, the tractor under certain practices may be detached from the unit and the trailer left in its loaded condition at the destination point for the purpose of unloading the supplies or materials. After the trailer is unloaded it will be moved, or it may be expedient during its unloading to move it from one area to another for the purpose of unloading the materials or supplies at an area convenient to their use. A problem has existed around industrial plants and particularly around shipyards in moving the trailers after the tractor has been detached. This is for the reason that industries or shipyards have, for economic reasons, only a limited number of tractors and there are many occasions when employees may wait for hours until a tractor is available, consequently the lost waiting time is quite expensive.

Industrial trucks are substantially less expensive to purchase than tractors and they have a variety of uses, particularly around a shipyard and are readily available for usage but they are not inherently equipped to propel a large trailer for moving it from one location to another.

The present invention overcomes the above problem and has among its objects:

The provision of an attachment for the forked extensions of an industrial truck which is readily applied to adapt it for movement of a trailer and readily removed to permit normal use of the industrial truck.

Another object resides in the provision of an attachment in the form of a unitary structure which receives and retains the forked extensions of an industrial truck and has other structure which supports the trailer for movement.

Still another object is to provide a unitary attachment for an industrial truck which mounts a support for receiving a trailer in a manner permitting movement of the trailer through the motive power of the truck.

Other objects, advantages and novel features of the invention will become apparent from the following explanation of the invention.

The attachment or adapter is formed of two spaced parallel sleeve members which are elongate and have open ends permitting the forked extensions of an industrial truck to be received thereby. The sleeve members are formed into an integral unit by connecting rib means and are in a horizontal plane when applied to the worked extensions. A support is mounted to the unit above the sleeves and functions to receive the front end of the trailer for articulating the truck and trailer to permit the trailer to be moved by the truck operator. For use with one type of trailer, the support has a swivel or pivotal connection with the attachment of the invention and is operative to provide for rotative or arcuate movement between the trailer and the industrial truck for moving the trailer from one position to another. For another type of trailer having guiding means in the form of a "fifth wheel" the support may be fixedly mounted to the unit and secured to the "fifth wheel" by a pin connection which permits arcuate movement of the trailer relative to the attachment.

For a better understanding of the invention reference should be made to the drawings wherein.

Figure 1:
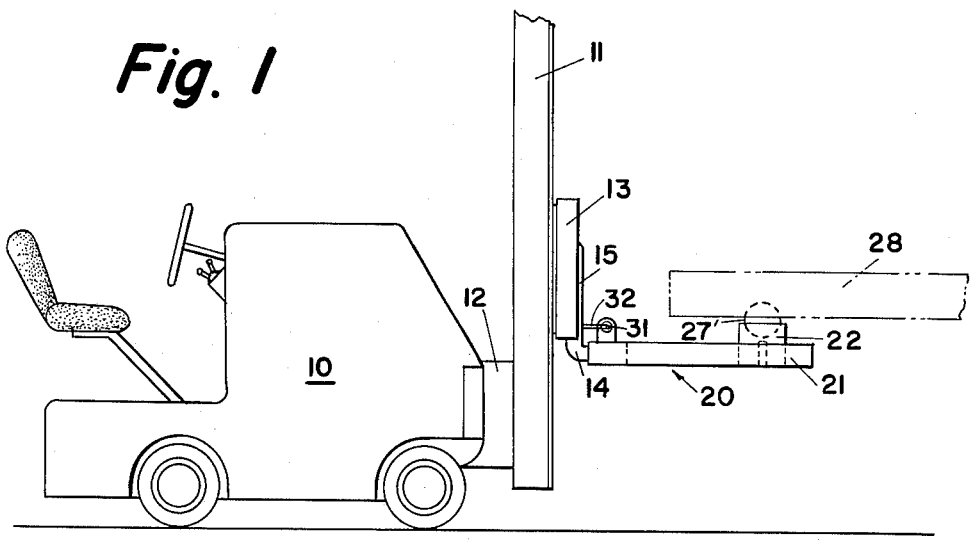
FIGURE 1 is a view in elevation of an assembly of an industrial truck of the fork lift type and the attachment or adapter of the invention and showing the front end of a trailer positioned on the attachment support.

Referring to FIGURE 1, an industrial lift truck is indicated at 10 and represents any type having forked extensions which are arranged for vertical movement on a vertical frame 11 which is supported by the truck body by means of a connecting block 12. The frame 11 provides a guideway, the details of which are not shown, but which receives a carriage 13 that is actuated through mechanisms provided on industrial trucks to raise and lower the carriage relative to the frame 11. The extensions are in the form of a pair of similar elongate shafts 14 each having an integral portion 15 which is bent upwardly and fixedly secured to the carriage 13 in a manner to be movable therewith.

Figure 2:
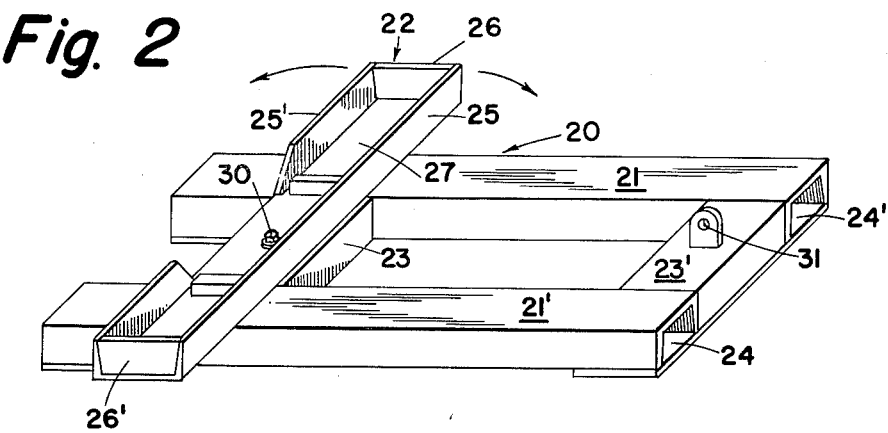
FIGURE 2 is a view in perspective of the attachment or adapter of the invention.

The attachment of the present invention is shown at 20 in FIGURE 2 and provides a unitary structure which is formed of similar elongate sleeves $21$–$21^1$ and a support 22. The sleeve $21$–$21^1$ are interconnected into a unit and spaced to receive the pair of elongate forks or extensions 14 by ribs $23$–$23^1$. The support 22 is conveniently mounted on the rib 23 to form the rear end of the unit while the sleeves have open front ends $24$–$24^1$ by which the forks or extensions are inserted. The elongate forks or extensions 14 are received by the openings $24$–$24^1$ of the sleeves $21$–$21^1$ in a telescoping fashion and the relative thicknesses between the shafts and the sleeves is such as to provide a snug fit and yet allow ready application or removal of the unit. The relative lengths between the shafts and sleeves are such as to provide a substantially rigid combined structure when the shafts are properly received by the sleeves.

The support 22, in the embodiment shown, is provided with side walls $25$–$25^1$, end walls $26$–$26^1$, and a base 27 to in effect provide a compartment having a width and length to conveniently receive the similar guide wheels $27'$ of a trailer 28 of the type shown in FIGURE 1. In this type of trailer the axle for the wheels does not permit the wheel assembly to function as a steering mechanism and for this purpose the support 22 is swivelled or pivoted at 30 to the unit 20. When the trailer is received by the support 22 as shown in FIGURE 1, the truck operator can by proper manipulation of the truck move the trailer as desired, through forward, backward or angular motions.

If the trailer is of the type having a fifth wheel arrangement, which is in the form of a plate fixed to and depending from the front end of the trailer, the support of the invention may be in the form of a fixed mating plate. In such an arrangement a pin is, for example, attached to the trailer plate and received in a passageway in the support plate to provide the pivotal motion. When the unit 20 is assembled as shown in FIGURE 1 and the mass or weight of the trailer 28 is applied to the assembly, it may be desirable to secure the unit 20 to the industrial truck. For this purpose an apertured stud 31 is formed integral with the front end of the unit conveniently on the front rib $23^1$ to receive one end of a connector 32 which has its other end fixed to the truck 10.

Obviously many modifications and variations of the present invention are possible in the light of the above teachings. It is therefore to be understood that, within the scope of the appended claim, the invention may be practiced otherwise than as specifically described.

I claim:

The combination of an industrial truck having spaced horizontal elongate lift arms mounted for vertical movement and an adapter whereby a trailer having a pair of transversely spaced guide wheels depending from its front end may be manipulated by the operator of the industrial truck, a. said adapter comprising a pair of parallel open end elongate sleeves,
b. a front spacer and a rear spacer interconnecting and positioning the sleeves for receiving said horizontal lift arms in telescoping relation,
c. an elongate base pivotally mounted on said front spacer and having a length greater than the transverse spacing between the pair of trailer guide wheels,
d. said base having opposed pairs of vertical side walls extending upwardly and forming a compartment having an upper open end permitting the guide wheels to be received therein and
e. said pairs of opposed vertical side walls extending a sufficient distance above the base to provide chocking means for the wheels.

References Cited by the Examiner

UNITED STATES PATENTS

| | | | |
|---|---|---|---|
| 2,362,991 | 11/1944 | Dahl | 214—620 X |
| 2,410,373 | 10/1946 | Westervelt | 214—620 |
| 2,411,061 | 11/1946 | Saxon | 214—334 |
| 2,582,759 | 1/1952 | Sass | 214—620 |
| 2,714,463 | 8/1955 | Fraser | 214—620 |
| 2,809,759 | 10/1957 | Manker | 214—620 |
| 3,007,592 | 11/1961 | Adams | 214—620 |
| 3,115,261 | 12/1963 | Antolini | 214—620 |
| 3,127,193 | 3/1964 | Johnson et al. | 280—402 |

GERALD M. FORLENZA, *Primary Examiner.*

R. B. JOHNSON, *Assistant Examiner.*